US012705779B2

(12) United States Patent
Park et al.

(10) Patent No.: US 12,705,779 B2
(45) Date of Patent: Aug. 11, 2026

(54) ELECTRONIC DEVICE FOR OBTAINING LOCATION OF VIRTUAL OBJECT AND METHOD THEREOF

(71) Applicant: SAMSUNG ELECTRONICS CO., LTD., Suwon-si (KR)

(72) Inventors: Choelmin Park, Suwon-si (KR); Sungoh Kim, Suwon-si (KR); Jaeyung Yeo, Suwon-si (KR); Chungwan Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 294 days.

(21) Appl. No.: 18/242,955

(22) Filed: Sep. 6, 2023

(65) Prior Publication Data

US 2024/0161328 A1 May 16, 2024

Related U.S. Application Data

(63) Continuation of application No. PCT/KR2023/011173, filed on Jul. 31, 2023.

(30) Foreign Application Priority Data

Nov. 10, 2022 (KR) ........................ 10-2022-0150003
Nov. 15, 2022 (KR) ........................ 10-2022-0152794

(51) Int. Cl.
*G06T 7/70* (2017.01)
*G06T 17/00* (2006.01)
*G06V 20/40* (2022.01)

(52) U.S. Cl.
CPC ................ *G06T 7/70* (2017.01); *G06T 17/00* (2013.01); *G06V 20/44* (2022.01)

(58) Field of Classification Search
CPC ........... G06T 7/70; G06T 17/00; G06V 20/44; G06V 20/20; G06F 3/011
(Continued)

(56) References Cited

U.S. PATENT DOCUMENTS 7,043,695 B2 * 5/2006 Elber et al. .............. G09G 5/00 715/771
10,037,342 B2 * 7/2018 Kikuchi et al. ... G06F 17/30241
(Continued)

FOREIGN PATENT DOCUMENTS

JP 2008-107895 A 5/2008
JP 2020-107264 A 7/2020
(Continued)

OTHER PUBLICATIONS

International Search Report (PCT/ISA/210) issued on Nov. 21, 2023 by the International Searching Authority in International Patent Application No. PCT/KR2023/011173.
(Continued)

*Primary Examiner* — Matthew C Bella
*Assistant Examiner* — Daniel Joseph Santos
(74) *Attorney, Agent, or Firm* — Sughrue Mion, PLLC

(57) ABSTRACT

An electronic device includes at least one processor that is configured to receive, from an external electronic device, a first signal including a request for arranging a first virtual object in a virtual space. The at least one processor is configured to obtain, by using first user information with respect to the first virtual object and second user information with respect to second virtual objects, a group corresponding to the first virtual object among groups respectively corresponding to second virtual objects. The at least one processor is configured to identify, based on a location of at least one second virtual object included in the group corresponding to the first virtual object, a first location in the virtual
(Continued)

space. The at least one processor is configured to transmit, a second signal, to the external electronic device, representing the first virtual object being disposed in the identified first location in the virtual space.

17 Claims, 9 Drawing Sheets

(58) Field of Classification Search
USPC .......................................................... 382/103
See application file for complete search history.

(56) References Cited

U.S. PATENT DOCUMENTS

| | | | |
|---|---|---|---|
| 10,969,924 B2 | 4/2021 | Kurata et al. | |
| 11,244,510 B2 * | 2/2022 | Suzuki | G06T 19/006 |
| 11,361,497 B2 | 6/2022 | Ishikawa et al. | |
| 11,563,998 B2 * | 1/2023 | Otsuka et al. | H04N 21/4312 |
| 2005/0253851 A1 | 11/2005 | Tsukamoto | |
| 2013/0328927 A1 * | 12/2013 | Mount et al. | G06T 19/006 |
| 2022/0255995 A1 * | 8/2022 | Berliner et al. | H04L 67/131 |
| 2024/0203080 A1 * | 6/2024 | Yan et al. | G06T 19/20 |

FOREIGN PATENT DOCUMENTS

| | | |
|---|---|---|
| JP | 2020-129176 A | 8/2020 |
| JP | 6955861 B2 | 10/2021 |
| JP | 7131542 B2 | 9/2022 |
| KR | 10-1839118 B1 | 3/2018 |
| KR | 10-2341752 B1 | 12/2021 |
| KR | 10-2368616 B1 | 3/2022 |
| KR | 10-2415719 B1 | 7/2022 |
| KR | 10-2428095 B1 | 8/2022 |

OTHER PUBLICATIONS

Written Opinion (PCT/ISA/237) issued on Nov. 21, 2023 by the International Searching Authority in International Patent Application No. PCT/KR2023/011173.

* cited by examiner

ELECTRONIC DEVICE FOR OBTAINING LOCATION OF VIRTUAL OBJECT AND METHOD THEREOF

CROSS-REFERENCE TO RELATED APPLICATIONS

This application is a by-pass continuation application of International Application No. PCT/KR2023/011173, filed on Jul. 31, 2023, which is based on and claims priority to Korean Patent Application Nos. 10-2022-0150003, filed on Nov. 10, 2022, and 10-2022-0152794, filed on Nov. 15, 2022, in the Korean Intellectual Property Office, the disclosures of which are incorporated by reference herein their entireties.

BACKGROUND

1. Field

The disclosure relates to an electronic device for obtaining a location of a virtual object and a method thereof.

2. Detailed Description of Related Art

In order to provide an enhanced user experience, an electronic device is developed to provide an augmented reality (AR) service that display information generated by a computer in association with an external object in the real world. The electronic device may be a wearable device worn by a user. For example, the electronic device may be AR glasses and/or a head-mounted device (HMD).

SUMMARY

According to an aspect of the disclosure, an electronic device may include a communication circuitry, a memory, and at least one processor operatively connected to the communication circuitry and the memory. The at least one processor may be configured to receive, from an external electronic device via the communication circuitry, a first signal including a request for arranging a first virtual object in a virtual space. The at least one processor may be configured to obtain, by using first user information with respect to the first virtual object and second user information with respect to a plurality of second virtual objects, a group corresponding to the first virtual object among a plurality of groups respectively corresponding to the plurality of second virtual objects. The at least one processor may be configured to determine, based on a location, in the virtual space, of at least one second virtual object included in the group corresponding to the first virtual object, a location in the virtual space. The at least one processor may be configured to transmit, a second signal, to the external electronic device, representing the first virtual object being disposed in the identified location in the virtual space.

According to an aspect of the disclosure, a method of an electronic device may include receiving, from an external electronic device via a communication circuitry in the electronic device, a first signal including a request for arranging a first virtual object in a virtual space. The method may include identifying, in a first state, a first location of the first virtual object based on spatial information with respect to the virtual space. The method may include identifying, in a second state, among a plurality of groups respectively corresponding to a plurality of second virtual objects, a group corresponding to the first virtual object. The method may include identifying, based on a second location, in the virtual space, of at least one second virtual object of the group corresponding to the first virtual object, a third location, in the virtual space, in which the first virtual object is located. The method may include transmitting, to the external electronic device, a second signal for locating the first virtual object, in the virtual space, based on at least one of the first location or the third location.

According to an aspect of the disclosure, a method of an electronic device includes: receiving, from an external electronic device via a communication circuitry in the electronic device, a first signal including a request for arranging a first virtual object in a virtual space. The method may include obtaining, by using first user information with respect to the first virtual object and second user information with respect to a plurality of second virtual objects, a group corresponding to the first virtual object among a plurality of groups respectively corresponding to the plurality of second virtual objects. The method may include identifying, based on a location, in the virtual space, of at least one second virtual object of the group corresponding to the first virtual object, a location, in the virtual space, where the first virtual object is disposed. The method may include transmitting, a second signal, to the external electronic device, representing the first virtual object disposed in the identified location in the virtual space. According to an embodiment, an electronic device may include a communication circuitry and a processor. The processor may be configured to receive, from an external electronic device via a communication circuitry, a first signal including a request for arranging a first virtual object in a virtual space. The processor may be configured to identify, in a first state, a first location in the virtual object based on spatial information with respect to the virtual space. The processor may be configured to, in a second state, identify, among a plurality of groups respectively corresponding to a plurality of second virtual objects, a group corresponding to the first virtual object. The processor may be configured to identify, based on a second location, in the virtual space, of at least one second virtual object of the group corresponding to the first virtual object, a third location, in the virtual object, in which the first virtual object is located. The processor may be configured to transmit, to the external electronic device, a second signal for locating the first virtual object, in the virtual space, based on at least one of the first position or the third position.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
FIG. 1 illustrates an exemplary diagram of a first embodiment environment in which a metaverse service is provided through a server.
Figure 1:
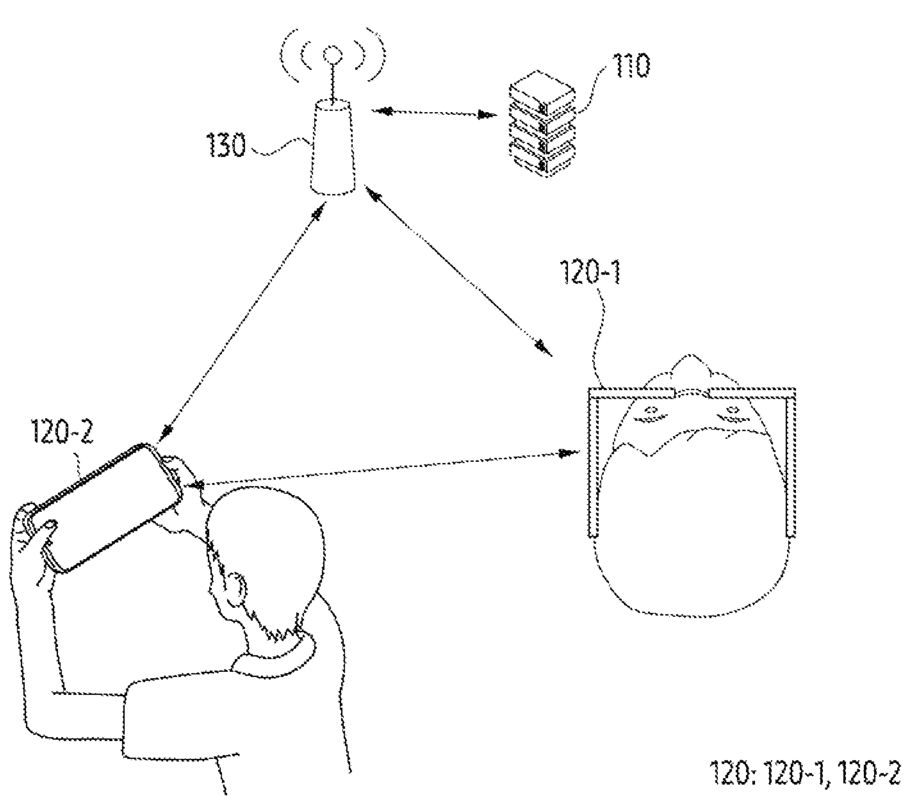

Hereinafter, one or more embodiments of the disclosure will be described with reference to the accompanying drawings.

One or more embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with one or more embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

'Metaverse' is a combination of the English words Meta, which means "virtual" and "transcendence," and "Universe," which means the universe, and refers to a three-dimensional virtual world where social, economic, and cultural activities like the real world take place. Metaverse is a concept that has evolved one step further than virtual reality. Metaverse is characterized by using avatars to enjoy games, virtual reality (VR), or social and cultural activities like real reality. The VR is a cutting-edge technology that enables people to experience real-life experiences in a computerized virtual world.

Such service of metaverse may be provided in at least two forms. The first form is to provide services to users by using a server, and the second form is to provide services through individual contacts between users.

FIG. 1 is an exemplary diagram of a first embodiment environment 101 in which a metaverse service is provided through a server 110.

In FIG. 1, the first embodiment environment 101 includes a server 110 providing a metaverse service, a network (e.g., a network formed by at least one intermediate node 130 including an access point (AP) or a base station) connecting the server 110 and each of user terminals (e.g., a user terminal 120 including a first terminal 120-1 and a second terminal 120-2). A user terminal enables the use of services by accessing the server through the network and providing input and output to the metaverse service to the user.

The server 110 provides a virtual space so that the user terminal 120 (e.g., the first terminal 120-1 and the second terminal 120-2) may perform an activity in the virtual space. In addition, the user terminal 120 (e.g., the first terminal 120-1 and the second terminal 120-2) installs a software (S/W) agent for accessing the virtual space provided by the server 110 to represent the information provided by the server 110 to the user or to transmit the information that the user wants to represent in the virtual space to the server.

The S/W agent may be directly provided through the server 110, may be downloaded from a public server, or may be embedded when purchasing the user terminal.

Figure 2:
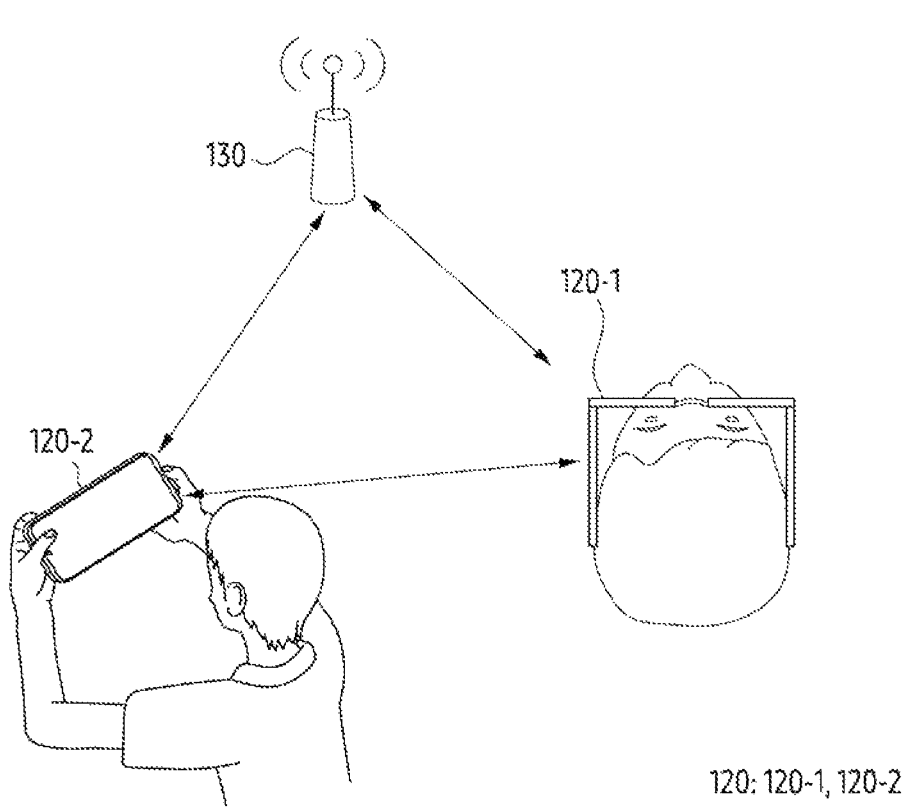
FIG. 2 illustrates an exemplary diagram of a second embodiment environment in which a metaverse service is provided through a direct connection between user terminals and a second terminal.

FIG. 2 is an exemplary diagram of an environment 102 of a second embodiment 102 in which a metaverse service is provided through direct connection between user terminals and a second terminal (e.g., the first terminal 120-1 and the second terminal 120-2).

In FIG. 2, the environment 102 of the second embodiment includes the first terminal 120-1 providing a metaverse service, a network connecting each user terminal (e.g., a network formed by at least one intermediate node 130), and the second terminal 120-2 that allows a second user to use the service by inputting/outputting to the metaverse service by connecting to the first terminal 120-1 through the network.

In the second embodiment illustrated in FIG. 2, the first terminal 120-1 provides a metaverse service by performing the role of a server (e.g., the server 110 of FIG. 1) in the first embodiment. That is, in one embodiment, the metaverse environment may be configured only by connecting the device to the device.

In the first and second embodiments, the user terminal 120 (or the user terminal 120 including the first terminal 120-1 and the second terminal 120-2) may be made of multiple form factors. The user terminal may include an output device that provides an image or/and sound to a user and an input device for inputting information into a metaverse service. Examples of multiple form factors of the user terminal 120 may include a smartphone (e.g., the second terminal 120-2), an AR device (e.g., the first terminal 120-1), a VR device, a Mixed Reality (MR) device, a video see through (VST) device, or a television (TV), or projector capable of input/output.

The network of the disclosure (e.g., a network formed by at least one intermediate node 130) includes all of various broadband networks including 3G, 4G, and 5G and a short-range network (e.g., a wired network or a wireless network directly connecting the first terminal 120-1 and the second terminal 120-2) including Wi-Fi, Bluetooth (BT), and the like.

Figure 3:
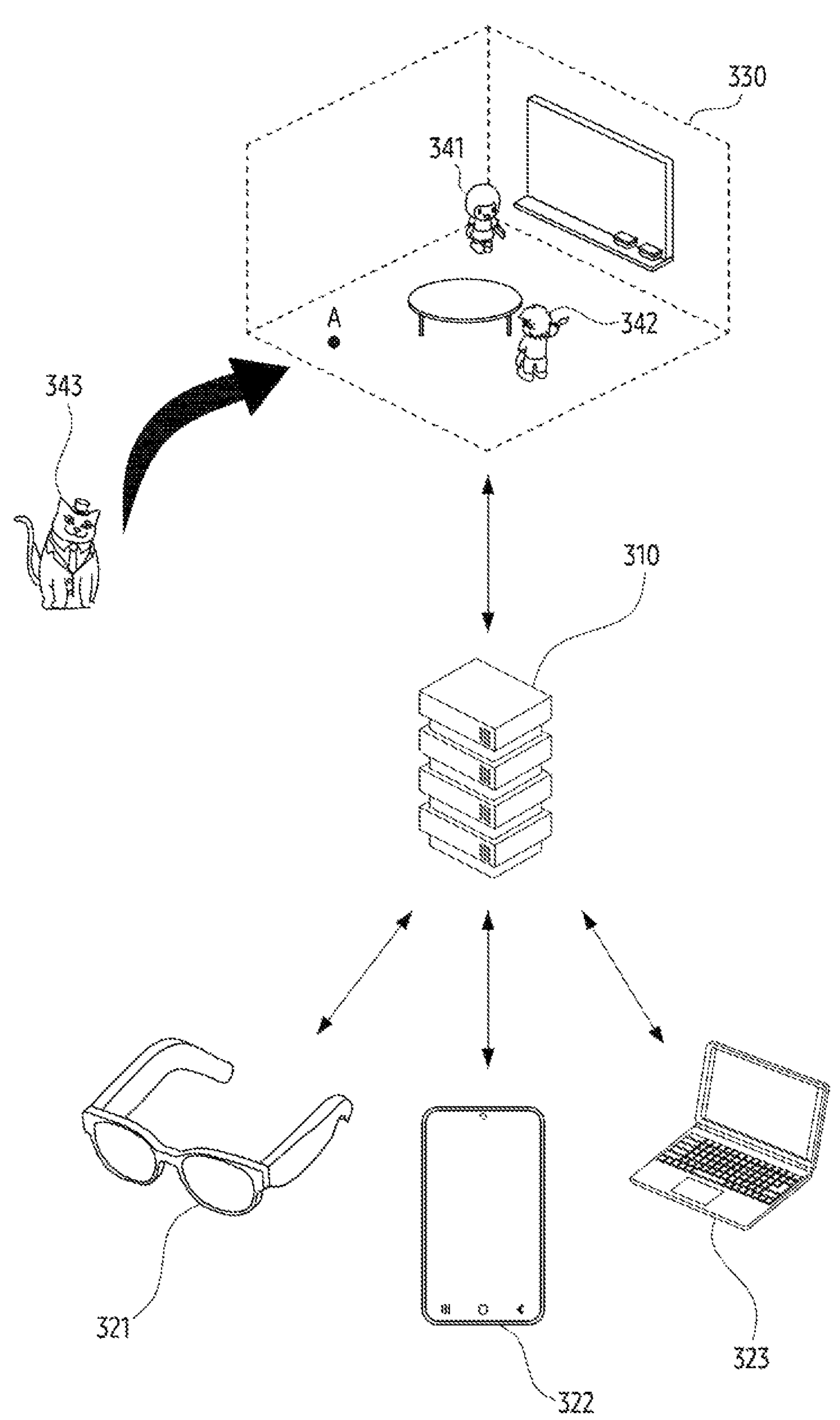
FIG. 3 illustrates an example of an operation in which an electronic device exchanges a signal based on a virtual space according to an embodiment.

FIG. 3 illustrates an example of an operation in which an electronic device 310 exchanges a signal based on a virtual space 330 according to an embodiment. The electronic device 310 of FIG. 3 may include a server 110 of FIG. 1. An exemplary structure of hardware of the electronic device 310 will be described with reference to FIG. 4.

According to an embodiment, the electronic device 310 may be connected to an external electronic device (e.g., a head-mounted display (HMD) 321, a mobile phone 322, and/or a laptop personal computer (PC) 323) through a network. The network may include a wired network such as the Internet, a local area network (LAN), a wide area network (WAN), an Ethernet, or a combination thereof. The network may include a wireless network such as long term evolution (LTE), 5G new radio (NR), wireless fidelity (WiFi), Zigbee, near field communication (NFC), Bluetooth, Bluetooth-low-energy (BLE), or a combination thereof. Although the electronic device 310 is illustrated as being directly connected to one or more external electronic devices, the electronic device 310 may be indirectly connected through an intermediate node (e.g., an intermediate node 130 of FIGS. 1 to 2).

According to an embodiment, the electronic device 310 may provide functions related to an immersive service platform. In one embodiment, the electronic device 310 may provide a service (e.g., the 'metaverse' service described above with reference to FIGS. 1 to 2) based on the virtual space 330. The electronic device 310 may provide the service by using room information (or spatial information) for forming or establishing the virtual space 330. In one embodiment, the electronic device 310 may form a virtual world (e.g., a metaverse world) in which a plurality of virtual spaces including the virtual space 330 are connected. An example of an operation in which the electronic device 310 identifies the virtual space 330 based on the spatial information will be described with reference to FIG. 5.

The electronic device 310 may arrange one or more virtual objects in the virtual space 330 formed along a coordinate system (e.g., a two-dimensional coordinate system, or a three-dimensional coordinate system) formed by a plurality of axes (e.g., an x-axis, a y-axis, and/or a z-axis). The one or more virtual objects may include virtual objects representing each of different users accessed to the virtual space 330, such as avatars 341, 342, and 343. In one embodiment, the one or more virtual objects in the virtual space 330 may be formed independently of the avatar corresponding to the user.

According to an embodiment, the electronic device 310 may identify the one or more external electronic devices that transmit a signal to the electronic device 310 to access the virtual space 330. Referring to FIG. 3, different external electronic devices (e.g., an HMD 321, a mobile phone 322, and/or a laptop PC 323) that transmit the signal to the electronic device 310 are exemplified, but the form factor of the external electronic device capable of communicating with the electronic device 310 is not limited thereto. The external electronic device capable of communicating with the electronic device 310 may include a user terminal 120 of FIGS. 1 and 2).

In FIG. 3, the electronic device 310 may dispose an avatar 341 corresponding to the HMD 321 in the virtual space 330 based on the received signal for accessing the virtual space 330 from the HMD 321. The signal may include information (e.g., identification of the user of HMD 321) for selecting user information corresponding to the user of the HMD 321 among user information stored in the electronic device 310. The electronic device 310 may identify one or more parameters indicating the shape, color, and/or size of the avatar 341, based on the user information corresponding to the user of the HMD 321. Based on the one or more parameters, the electronic device 310 may dispose the avatar 341 in the virtual space 330. The electronic device 310 may transmit a signal for displaying at least a portion of the virtual space 330 included in a view angle of the avatar 341 to the HMD 321.

In one embodiment, the electronic device 310 (e.g., the mobile phone 322) may transmit the signal for accessing the virtual space 330 and may transmit the signal for displaying at least a portion of the virtual space 330 included in the view angle of the avatar 342 corresponding to the user of the mobile phone 322. As the number of external electronic devices connected to the electronic device 310 increases, the number of avatars disposed in the virtual space 330 may increase. Referring to FIG. 3, while the avatars 341 and 342 corresponding to the HMD 321 and the mobile phones 322 are disposed in the virtual space 330, an exemplary state in which the electronic device 310 receives the signal for accessing the virtual space 330 from the laptop PC 323 is illustrated.

According to an embodiment, the electronic device 310 may determine the location of the avatar 343 corresponding to the laptop PC 323 in the virtual space 330 and/or based on information on each of one or more avatars (e.g., the avatars 341 and 342) disposed in the virtual space 330 and/or the virtual space 330. The electronic device 310 may receive a first signal from the laptop PC 323 including a request for disposing the virtual object such as the avatar 343 in the virtual space 330. Based on receiving the first signal, the electronic device 310 may identify or determine a user logged into the laptop PC 323 and the user information corresponding to the user. The electronic device 310 may identify the avatar 343 to be disposed in the virtual space 330, based on the user information. The electronic device 310 may determine a location where the avatar 343 is to be disposed, by using (or based on) spatial information for forming or establishing the virtual space 330. An operation in which the electronic device 310 selects the location of the avatar 343 in the virtual space 330, by using (or based on) the spatial information, will be described with reference to FIG. 5.

According to an embodiment, the electronic device 310 may select the location of the avatar 343 based on the relationship between the avatars (e.g., the avatars 341 and 342) and the avatar 343 added in the virtual space 330, in a state of adding the avatar 343 in the virtual space 330. Referring to FIG. 3, the electronic device 310 may identify a group corresponding to the avatar 343 among the groups assigned (or allocated) to each of the avatars 341 and 342, by using the first user information on the avatars 343 and the second user information on the avatars 341 and 342 accessed to the virtual space 330. An operation of grouping different virtual objects (e.g., the avatars 341, 342, and 343) related to the virtual space 330 by the electronic device 310, by using the user information corresponding to the virtual objects, will be described with reference to FIG. 6.

According to an embodiment, the electronic device 310 may identify a group corresponding to the avatar 343 among the groups of avatars 341 and 342 included in the virtual space 330, in the state of adding the avatar 343 in the virtual space 330. The electronic device 310 may determine the location 'A' of the avatar 343 in the virtual space 330 based on the group corresponding to the avatar 343. The electronic device 310 may transmit a signal for displaying at least a portion of the virtual space 330 (included in the view angle of the avatar 343 disposed) at the selected location A to the laptop PC 323. The electronic device 310 may transmit the signal for adding the avatar 343 to the screens of the one or more external electronic devices (e.g., the HMD 321, the mobile phone 322, and/or the laptop PC 323) related to the virtual space 330. An operation of the electronic device 310 transmitting the signal to the one or more external electronic devices, based on the avatar 343 added to the virtual space 330, will be described with reference to FIG. 7.

According to an embodiment, the electronic device 310 may improve the interconnectivity of physically separated external electronic devices (e.g., the HMD 321, the mobile phone 322, and/or the laptop PC 323) by using the virtual space 330. By using the avatars 341 and 342 of the virtual space 330, the electronic device 310 may support the exchange of information between the HMD 321 and the mobile phone 322 corresponding to each of the avatars 341 and 342. In a state in which avatars 341 and 342 (corresponding to each of HMD 321 and mobile phone 322) are disposed in the virtual space 330, the electronic device 310 may identify the laptop PC 323 requests for adding the avatar 343 in the virtual space 330. Based on such request from the laptop PC 323, the electronic device 310 may determine an initial location in the virtual space 330 of the avatar 343, which is the virtual object corresponding to the laptop PC 323, based on the one or more virtual objects (e.g., the avatars 341 and 342) of the virtual space 330 and the user information of each virtual object (e.g., the avatar 343) corresponding to the laptop PC 323. In one embodiment, the electronic device 310 may dispose the avatar 343 at a location adjacent to at least one avatar having a property similar to that of the avatar 343 among the avatars 341 and 342 in the virtual space 330, based on actions performed by the user of the laptop PC 323 in the virtual space 330, and/or the user's profile.

Hereinafter, the structure of hardware of the electronic device 310 according to an embodiment will be described with reference to FIG. 4.

Figure 4:
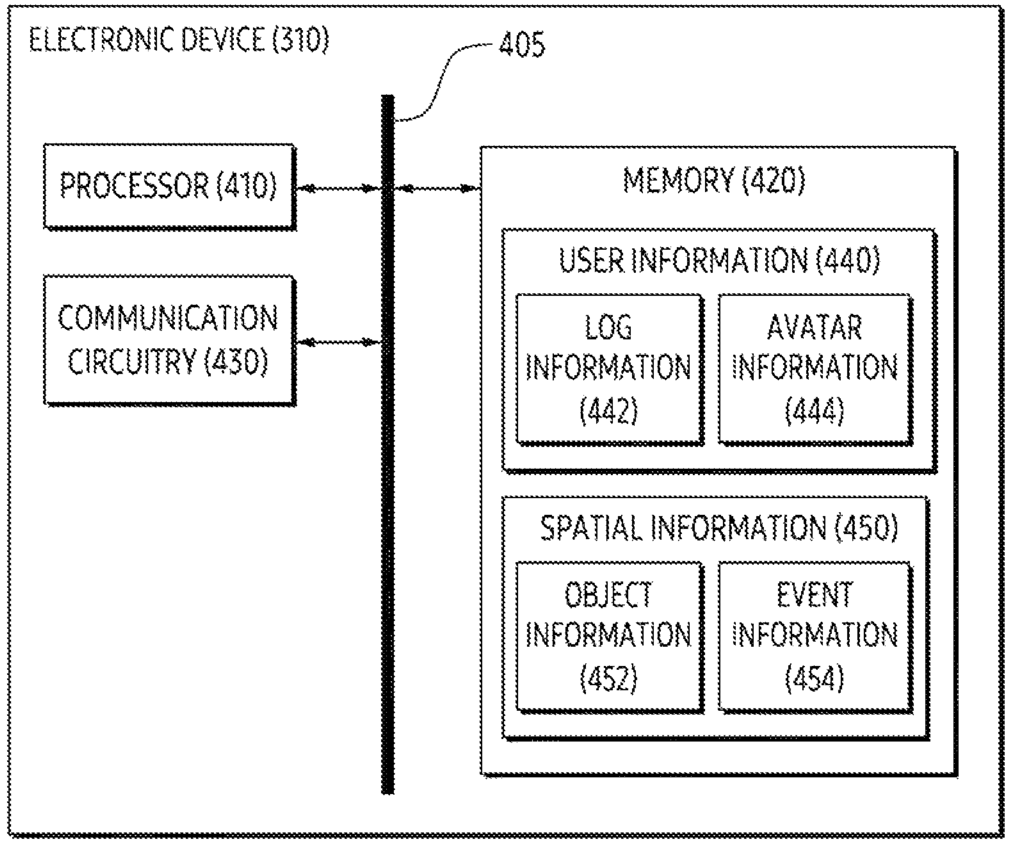
FIG. 4 illustrates an example of a block diagram of an electronic device according to an embodiment.

FIG. 4 illustrates an example of a block diagram of an electronic device 310 according to an embodiment. The electronic device 310 of FIG. 4 may include a server 110 of FIG. 1 and the electronic device 310 of FIG. 3. The electronic device 310 may include at least one of at least one processor 410, a memory 420, or a communication circuitry 430. The at least one processor 410, the memory 420, and the communication circuitry 430 may be electronically and/or operably coupled with each other by an electronic component such as a communication bus 405. Hereinafter, the operational combination of hardware may mean that direct or indirect connection between hardware is established by wire or wirelessly so that the second hardware is controlled by the first hardware among the hardware. Although illustrated based on different blocks, the embodiment is not limited thereto, and some (e.g., at least some of the at least one processor 410, the memory 420, and the communication circuitry 430) of the hardware of FIG. 4 may be included in a single integrated circuitry, such as a system on a chip (SoC). The types and/or numbers of hardware components included in the electronic device 310 are not limited to those illustrated in FIG. 4.

According to an embodiment, the at least one processor 410 of the electronic device 310 may include a hardware component for processing data based on one or more instructions. The hardware component for processing data may include, for example, an arithmetic and logic unit (ALU), a floating point unit (FPU), a field programmable gate array (FPGA), and/or a central processing unit (CPU). The number of processors 410 may be one or more. For example, the at least one processor 410 may have a structure of a multi-core processor such as a dual core, a quad core, or a hexa core.

According to an embodiment, the memory 420 of the electronic device 310 may include the hardware component for storing data and/or instructions inputted to the at least one processor 410 or outputted from the at least one processor 410. The memory 420 may include, for example, volatile memory such as random-access memory (RAM), and/or non-volatile memory such as read-only memory (ROM). The volatile memory may include, for example, at least one of dynamic RAM (DRAM), static RAM (SRAM), Cache RAM, and pseudo SRAM (PSRAM). The non-volatile memory may include, for example, at least one of a programmable ROM (PROM), an erasable PROM (EPROM), an electrically erasable PROM (EEPROM), a flash memory, a hard disk, a compact disk, solid state drive (SSD) and an embedded multimedia card (eMMC).

In an embodiment, in the memory 420, one or more instructions (or commands) indicating a calculation and/or an operation to be performed on data by the at least one processor 410 may be stored. A set of one or more instructions may be referred to as firmware, operating system, process, routine, sub-routine and/or application. In one embodiment, the electronic device 310 and/or the at least one processor 410 may perform at least one of the operations of FIGS. 8 to 9 when a set of a plurality of instructions distributed in the form of the operating system, the firmware, driver, and/or the application is executed. Hereinafter, that the application is installed in the electronic device 310 may mean that the one or more instructions provided in the form of the application are stored in the memory 420 of the electronic device 310, and the one or more applications are stored in an executable format (e.g., a file having an extension preset by the operating system of the electronic device 310) by the at least one processor 410 of the electronic device 310.

According to an embodiment, the communication circuitry 430 of the electronic device 310 may include hardware for supporting transmission and/or reception of an electrical signal between the electronic device 310 and the external electronic device (e.g., an HMD 321, a mobile phone 322, and/or a laptop PC 323 of FIG. 3). The communication circuitry 430 may include, for example, at least one of a modem (MODEM), an antenna, and an optic/electronic (O/E) converter. The communication circuitry 430 may support transmission and/or reception of the electrical signal based on various types of protocols, such as Ethernet, local area network (LAN), wide area network (WAN), wireless fidelity (WiFi), Bluetooth, Bluetooth-low-energy (BLE), ZigBee, long term evolution (LTE), and 5G new radio (NR).

According to an embodiment, the at least one processor 410 of the electronic device 310 may execute one or more functions related to the virtual space (e.g., a virtual space 330 of FIG. 3), by communicating with one or more external electronic devices connected through the communication circuitry 430 such as a communication hardware component or a modem. The electronic device 310 may execute the one or more functions related to the virtual space, in order to execute a collaborative action such as a video conference between users of a plurality of external electronic devices connected to the electronic device 310. Referring to FIG. 4, the electronic device 310 may store the user information 440 related to users accessing the virtual space and/or spatial information 450 used to form the virtual space in the memory 420. Each of the user information 440 and the spatial information 450 may form a database (DB) used by the electronic device 310. The database may include at least one of a set of systematized information or the one or more applications that manage the information. In the set of information, information having different categories may be combined with each other based on units such as type, column, record, and/or table. The combined information may be used for adding, deleting, updating, and searching information in the database.

According to an embodiment, the electronic device 310 is the one or more external electronic devices that transmit a signal for accessing to the virtual space by using the user information 440 and/or the spatial information 450, and may determine locations of virtual objects (e.g., avatars corresponding to users of the one or more external electronic devices) corresponding to the one or more external electronic devices. In one embodiment, the location of the virtual object may be determined based on an event occurring in the virtual space and the locations of one or more other virtual objects disposed in the virtual space. In one embodiment, the electronic device 310 may identify a group to which the first virtual object is assigned, among groups to which each of the different second virtual objects included in the virtual space is assigned, in a state in which the first external electronic device transmits a first signal indicating that the first virtual object enters the virtual space. In one embodiment, the electronic device 310 may select an empty space in which no virtual object is disposed, based on the group to which the first virtual object is assigned. The electronic device 310 may determine the selected empty space as the location of the first virtual object. Based on the determined location of the first virtual object, the electronic device 310 may transmit a second signal indicating at least a portion of the virtual space viewed from the location to the first external electronic device as a response to the first signal.

According to an embodiment, the electronic device 310 may classify a plurality of users accessing the virtual space, based on the user information 440. The operation of classifying the plurality of users by the electronic device 310 may include an operation of obtaining a group corresponding to each of the plurality of users. The electronic device 310 may classify the plurality of users by using log information 442 and/or avatar information 444 included in the user information 440. The log information 442 may include a history of actions (e.g., an action on a virtual space) of the different users who have accessed the virtual space. The avatar information 444 may include one or more parameters (e.g., the shape and size of the avatar, one or more clothes worn by the avatar, and/or the form of the face of the avatar) for displaying the avatar in the virtual space.

In an embodiment, the classification of a plurality of users, which is performed by the electronic device 310, may be related to attributes of each of the plurality of users indicated by the user information 440. In one embodiment, the electronic device 310 may identify an attribute that is common among the plurality of users, based on the user information 440. In one embodiment, the attribute may include an action that is commonly performed in the virtual space, a hobby that users have in common, a myers-briggs type indicator (MBTI), an age, a gender, and a relative relationship. The attribute may include an authority allowed to the user for the virtual space formed by the spatial information 450. The attribute may include a list (e.g., a block list) set by each of the plurality of users. The embodiment is not limited thereto, and the attributes of the user information 440 may include other information on the user's preferences. In an embodiment, a process executed by the at least one processor 410 of the electronic device 310 may be referred to as a 'user analyzer' in order to classify the plurality of users accessing the virtual space.

According to an embodiment, the electronic device 310 may determine the location of at least one of the avatars corresponding to the plurality of users, based on a result of classifying the plurality of users by the execution of the 'user analyzer.' In order to determine the location of at least one of the avatars, a process executed by the at least one processor 410 of the electronic device 310 may be referred to as a location determiner. According to an embodiment, the electronic device 310 may determine the location of at least one avatar in the virtual space, based on the structure of the virtual space indicated by the spatial information 450. In one embodiment, the electronic device 310 may identify the structure of the virtual space by using object information 452 in the spatial information 450.

The operation of identifying the structure of the virtual space by the electronic device 310 may include identifying the location, size, and/or shape of one or more virtual objects (e.g., virtual objects in the form of chairs and/or tables) disposed in the virtual space. In one embodiment, the electronic device 310 may identify an event (e.g., a conference and/or lesson) generated through the virtual space by using event information 454 in the spatial information 450. In one embodiment, the electronic device 310 may identify one or more locations designated as the location (e.g., an initial location) of the avatar in the virtual space, based on the spatial information 450. Based on identifying the one or more locations from the spatial information 450, the electronic device 310 may determine the location of the avatar corresponding to at least one external electronic device accessing the virtual space.

According to an embodiment, the electronic device 310 may control the avatar in the virtual space, based on the signal received from the external electronic device corresponding to the avatar through the communication circuitry 430 in a state in which the avatar is disposed in the virtual space. The electronic device 310 may execute a process for monitoring the action of the avatar in the virtual space. The action of the avatar monitored by the electronic device 310 may be accumulated in the avatar information 444.

As described above, according to an embodiment, the electronic device 310 may transmit a signal representing at least a portion of the virtual space to the one or more external electronic devices connected through the communication circuitry 430, by using the spatial information 450 for forming or establishing the virtual space and the user information 440 for one or more users accessing the virtual space. The electronic device 310 may identify a relevance between the specific avatar corresponding to a specific user and one or more other avatars of the virtual space, based on identifying the external electronic device corresponding to the specific user entering the virtual space. In one embodiment, the electronic device 310 may classify the specific avatar into any one group among groups formed by the one or more other avatars. The electronic device 310 may select a location of the specific avatar in the virtual space based on a result of classifying a specific avatar into the any one group among groups. In one embodiment, a preset location for disposing the specific avatar may not be identified from the spatial information 450, or the specific avatar may not be classified into the any one group among groups. Then, the electronic device 310 may select the location of the specific avatar based on an arbitrary location (e.g., a location selected by a random number).

Hereinafter, an example of an operation in which the electronic device 310 identifies the location of at least one avatar entering the virtual space, by using spatial information 450, will be described with reference to FIG. 5.

Figure 5:
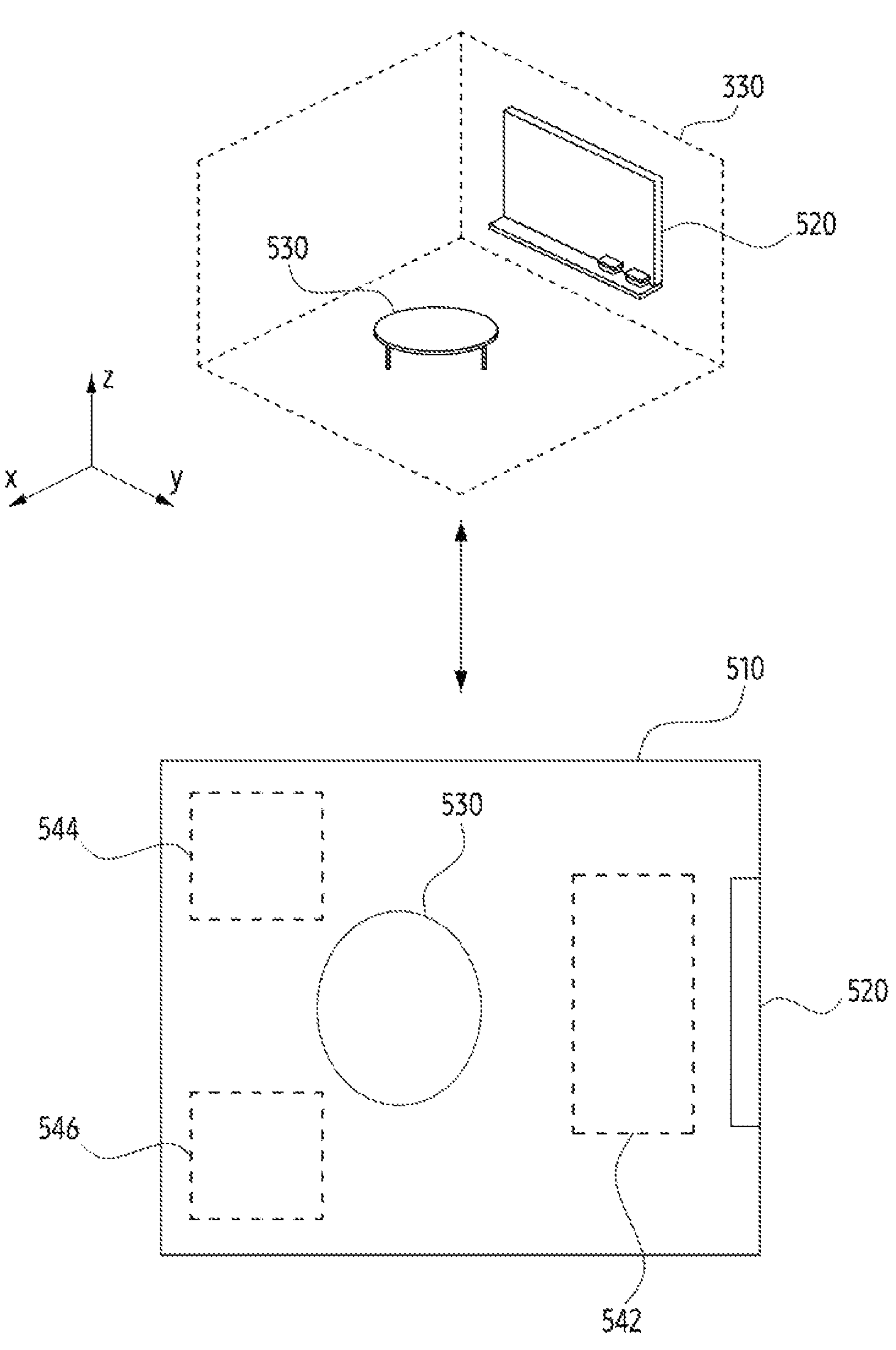
FIG. 5 illustrates an example of an operation in which an electronic device identifies spatial information for forming or establishing a virtual space, according to an embodiment.

FIG. 5 illustrates an example of an operation in which an electronic device identifies spatial information for forming or establishing a virtual space 330, according to an embodiment. An electronic device 310 of FIGS. 3 to 4 may include the electronic device of FIG. 5. The virtual space 330 of FIG. 5 may be an example of the virtual space 330 of FIG. 3.

According to an embodiment, the electronic device may identify the virtual space 330 by using spatial information (e.g., spatial information 450 of FIG. 4). The electronic device may identify the size (e.g., the width, breadth, depth, thickness, and/or height of the virtual space 330) of the virtual space 330 by using the spatial information. The electronic device may identify one or more virtual objects disposed in the virtual space 330 by using the spatial information. Referring to FIG. 5, a first virtual object 520 (having the shape of a blackboard) and a second virtual object 530 (having the shape of a table) are illustrated as examples of virtual objects identified by the electronic device from the spatial information. The type of the virtual object that may be disposed in the virtual space 330 by the spatial information is not limited by the embodiment of FIG. 5. In one embodiment, the electronic device may dispose one or more virtual objects having the shape of a chair, identified from spatial information, in the virtual space 330. In one embodiment, the electronic device may identify the location of the first virtual object 520 and the shape of the first virtual object 520 in the virtual space 330 from the spatial information. In one embodiment, the electronic device may identify the location of the second virtual object 530 and shape of the second virtual object 530 in the virtual space 330 from the spatial information.

Referring to FIG. 5, the electronic device may identify one or more parameters indicating a location for disposing one or more avatars from spatial information stored in the electronic device to form or establish the virtual space 330. The one or more parameters may include coordinate values indicating the location for disposing the one or more avatars. Referring to FIG. 5, a plan view of a plane 510 in the virtual space 330 is illustrated. The plane 510 may correspond to the x-y plane of the virtual space 330. The electronic device may identify the location of the virtual object 530 on the plane 510 of the virtual space 330 based on the spatial information. The electronic device may identify an area set to dispose the one or more avatars accessing the virtual space 330 based on the one or more parameters identified from the spatial information. Referring to FIG. 5, as an example of the area, areas 542, 544, and 546 indicated by the one or more parameters are illustrated.

Referring to FIG. 5, according to an embodiment, the electronic device may identify, from the spatial information, the areas 542, 544, and 546 that are set to dispose the avatar. Based on parameters aligned along a data structure such as 'rect' in the spatial information, the electronic device may identify the areas 542, 544, and 546. The 'rect' data structure may be a data structure in which numerical values (e.g., the x coordinate, y coordinate of a corner, the width and height of the quadrangle) related to a figure of quadrangle are aligned based on a preset order in a two-dimensional coordinate system. The electronic device may identify an attribute of an avatar corresponding to each of the areas 542, 544, and 546, together with the areas 542, 544, and 546. In one embodiment, the electronic device may identify, from the spatial information, a criterion for disposing the avatar in each of the areas 542, 544, and 546. The electronic device that identifies the avatar entering the virtual space 330 may select the location (e.g., an initial location) of the avatar among the areas 542, 544, and 546, based on user information (e.g., user information 440 of FIG. 4) corresponding to the avatar.

According to an embodiment, the electronic device may identify the location corresponding to the avatar among the areas 542, 544, and 546 by using at least one of the user information corresponding to the avatar and/or the spatial information including parameters for the areas 542, 544, and 546. In one embodiment, in case that the spatial information corresponding to the virtual space 330 indicates that a conference based on different groups occurs in the virtual space 330, the electronic device may match each of the areas 542, 544, and 546 with different groups. The electronic device may dispose the avatar entering the virtual space 330 in the virtual space 330 based on the group corresponding to the avatar and the area matched to the group. In one embodiment, the one or more avatars disposed in the area 542 may be included in a specific group matched to the area 542. In one embodiment, in case that the spatial information corresponding to the virtual space 330 indicates that a class performed by a specific avatar corresponding to a specific user occurs, the electronic device may dispose the specific avatar in a portion of the virtual space 330 adjacent to the virtual object 520, and other avatars different from the specific avatars may be dispose in another portion relatively separated from the virtual object 520. The specific avatar may be indicated by the spatial information.

According to an embodiment, the electronic device identifies the location of the avatar in the virtual space 330, which is not limited to the above example. The electronic device may identify the location and direction of the avatar in the virtual space 330. The direction may include a partial direction for representing a face in the avatar. The direction may include a direction of at least a portion of the virtual space 330 displayed through an external electronic device corresponding to the avatar. In one embodiment, the direction may correspond to the view angle of the avatar. In one embodiment, the spatial information may indicate that the location and the direction of the avatar are disposed toward the center of the virtual object 530 having the shape of the table in the virtual space 330. In one embodiment, the electronic device may dispose different avatars entering the virtual space 330 with the virtual object 530 as the center, to have a direction toward the center of the virtual object 530.

As described above, according to an embodiment, the electronic device may identify a first location where the first virtual object is to be disposed in the virtual space by using spatial information on the virtual space 330 in response to a first signal including a request for disposing the virtual object in the virtual space 330 from the external electronic device. The electronic device may transmit a second signal (related to the first location) to the external electronic device, in response to or based on the first signal. In one embodiment, the second signal may include information for disposing the first virtual object at the first location of the virtual space 330. Like the areas 542, 544, and 546, the electronic device may identify the first location based on a preset location set for the disposition of the first virtual object from the spatial information. In the first state in which the first location is identified, the electronic device may transmit the second signal representing the first virtual object disposed at the first location to the external electronic device. In the second state (that is different from the first state), the electronic device may determine the location of the avatars based on a result of grouping the avatars accessed to the virtual space 330. In one embodiment, the second state may include a state different from the first state in which the electronic device identifies at least one preset location set to dispose the avatar, such as the areas 542, 544, and 546, from the spatial information. In one embodiment, the second state may include a state in which the electronic device cannot identify at least one preset location set to dispose the avatar from the spatial information.

Hereinafter, an example of an operation in which an electronic device according to an embodiment groups different users corresponding to different avatars included in the virtual space 330 will be described with reference to FIG. 6.

Figure 6:
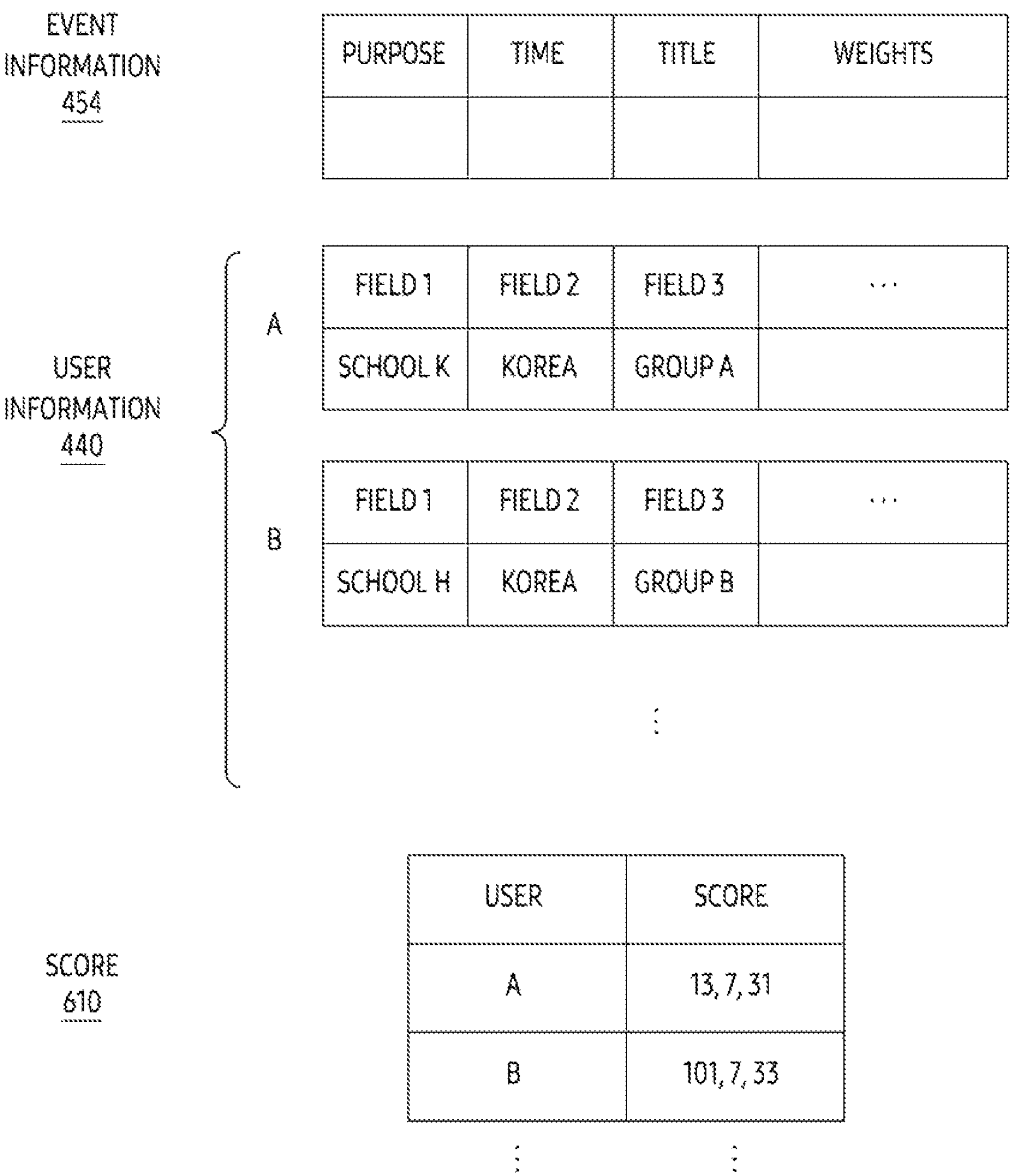
FIG. 6 illustrates an example of an operation in which an electronic device identifies different users accessing a virtual space through different external electronic devices according to an embodiment.

FIG. 6 illustrates an example of an operation in which an electronic device identifies different users accessing a virtual space through different external electronic devices according to an embodiment. An electronic device 310 of FIGS. 3 to 4 may include the electronic device of FIG. 6. In one embodiment, user information 440 and event information 454 of FIG. 4 may include the user information 440 and the event information 454 of FIG. 6. The external electronic devices of FIG. 6 may include a user terminal 120 of FIGS. 1 to 2, and/or the external electronic devices (e.g., an HMD 321) of FIG. 3, a mobile phone 322, and/or a laptop PC 323).

According to an embodiment, the electronic device may identify or determine the event information 454 from spatial information (e.g., spatial information 450 of FIG. 4). The event information 454 may include parameters related to one or more events occurring in the virtual space (e.g., a virtual space 330 of FIG. 3) corresponding to the event information 454. The event information 454 of FIG. 5 may include at least one of a purpose of the event, a time (e.g., beginning time, and/or end time) at which the event occurs, a title assigned to the event, or one or more weights for classifying a user (e.g., a participant) related to the event. The embodiment is not limited thereto, and the event information 454 may include a list of one or more users participating in the event and/or information (e.g., information indicating areas 542, 544, and 546 of FIG. 5) for disposing an avatar in the virtual space.

According to an embodiment, the electronic device may identify at least one external electronic device that transmits a first signal indicating entering the virtual space in a state of forming the virtual space corresponding to the event information 454 and/or the spatial information including the event information 454. The first signal may include a request for disposing at least one avatar corresponding to the at least one external electronic device in the virtual space. In response to or based on the first signal, the electronic device may transmit, to the at least one external electronic device, a second signal indicating a location of an avatar of the at least one external electronic device in the virtual space. In order to obtain one or more parameters to be included in the second signal, the electronic device may obtain the user information 440 corresponding to the at least one external electronic device. In one embodiment, the electronic device may identify at least one user logged into the at least one external electronic device by using the first signal. Based on the user information 440 corresponding to the at least one user, the electronic device may obtain the one or more parameters to be included in the second signal.

Referring to FIG. 6, the one or more parameters included in the user information 440 and related to the user corresponding to the user information 440 are exemplarily illustrated. Since the user information 440 is stored in the electronic device based on the format of the database, the one or more parameters included in the user information 440 may be classified by a location (e.g., field number, and/or field name) in the database in which the one or more parameters are stored. Referring to FIG. 6, an example in which the one or more parameters stored in the user information 440 corresponding to each of user A and user B are classified by the field number (e.g., field 1, field 2, and field 3) is illustrated. Referring to FIG. 6, as an example of a parameter stored in the user information 440, a school, a nationality, and/or a group including a user are illustrated. However, the embodiment is not limited thereto.

According to an embodiment, the electronic device may classify different virtual objects accessed in the virtual space based on the user information 440. Classifying the virtual objects by the electronic device may include classifying users corresponding to each of the virtual objects. In one embodiment, the electronic device may identify at least one group including each of the virtual objects. The electronic device may obtain a score for the virtual object by applying the weights (e.g., the weights stored in the event information 454 of FIG. 6) included in the spatial information to each of the parameters included in the user information 440 for the virtual object.

Referring to FIG. 6, an example of a score 610 obtained by the electronic device by combining weights stored in the event information 454 and parameters included in the user information 440 is illustrated. The electronic device may obtain one or more scores corresponding to the virtual objects accessed in the virtual space or the users corresponding to each of the virtual objects. In one embodiment, the electronic device may obtain scores 13, 7, 31 corresponding to the user A in the score 610 by multiplying numerical values indicating each of the parameters of the user information 440 corresponding to the user A by weights stored in the event information 454. In one embodiment, the score 13 corresponding to the user A in the score 610 may be a result of multiplying the numerical value corresponding to the parameter (e.g., school K) stored in the field 1 of the user information 440 of the user A and the weight corresponding to the field 1 among the weights in the event information 454. In one embodiment, the score 7 corresponding to the user A in the score 610 may be a result of multiplying the numerical value corresponding to the parameter (e.g., Korea) stored in the field 2 of the user information 440 of the user A and the weight corresponding to the field 2 among the weights in the event information 454. In one embodiment, the score 31 corresponding to the user A in the score 610 may be a result of multiplying the numerical value corresponding to a parameter (e.g., group A) stored in the field 3 of the user information 440 of the user A and the weight corresponding to the field 3 in the event information 454. Similarly, the electronic device may obtain one or more scores corresponding to the user B by multiplying the parameters stored in different fields of the user information 440 of the user B and the weights of the event information 454.

According to an embodiment, the electronic device may obtain groups corresponding to the users and/or the virtual objects, respectively, based on one or more scores corresponding to each of the users and/or the virtual objects accessed to the virtual space. In one embodiment, the electronic device may obtain the sum (e.g., 51) of scores corresponding to the user A and the sum (e.g., 141) of scores corresponding to the user B in the score 610. The electronic device may obtain the group of the users based on a weighted sum distribution of scores of different users. In one embodiment, at least two users having similar scores and/or the sum of similar scores may be classified into one group. In one embodiment, two users having a score difference exceeding a preset threshold value may be classified into different groups. In an embodiment in which the user and the avatar are matched one-to-one, a result of classifying the users accessed to the virtual space may be coincide with a result of classifying the avatars corresponding to the users.

In an embodiment, the criterion for classifying the users included in the virtual space of the electronic device may be related to the size of weights stored in the event information 454. In one embodiment, in case that the weight for the field 1 is greater than the weights of other fields, the deviation of the score for the field 1 may increase. Since the deviation is increased, the users may be classified by the field 1. In one embodiment, the weights stored in the event information 454 may include numerical values for classifying the users entering the virtual space in which the event corresponding to the event information 454 occurs. The result of classifying the users based on the weights may be used to adjust the locations of the users in the virtual space.

As described above, according to an embodiment, the electronic device may identify groups assigned to each of the virtual objects accessed into the virtual space based on the user information 440. The electronic device may identify the groups based on scores (e.g., the score 610) assigned to each of the virtual objects. The scores may be determined by weights included in the user information 440 and the spatial information (e.g., the event information 454) of the virtual space. In order to identify the groups corresponding to each of the virtual objects, weights indicated by the event information 454 may be used. In order to identify the groups corresponding to each of the virtual objects, different parameters included in the user information 440 may be used. The electronic device may identify a group including the first virtual object from among at least one group assigned to the second virtual objects included in the virtual space based on a request of the external electronic device for adding the first virtual object in the virtual space. The electronic device may identify a location in the virtual space where the first virtual object is to be disposed based on a location, in the virtual space, of at least one second virtual object included in the group corresponding to the first virtual object.

Hereinafter, with reference to FIG. 7, according to an embodiment, in a state in which the electronic device classifies the users in the virtual space and/or the virtual objects corresponding to the users based on the score 610, an example of an operation of selecting a location of another virtual object corresponding to another user different from the users will be described.

Figure 7:
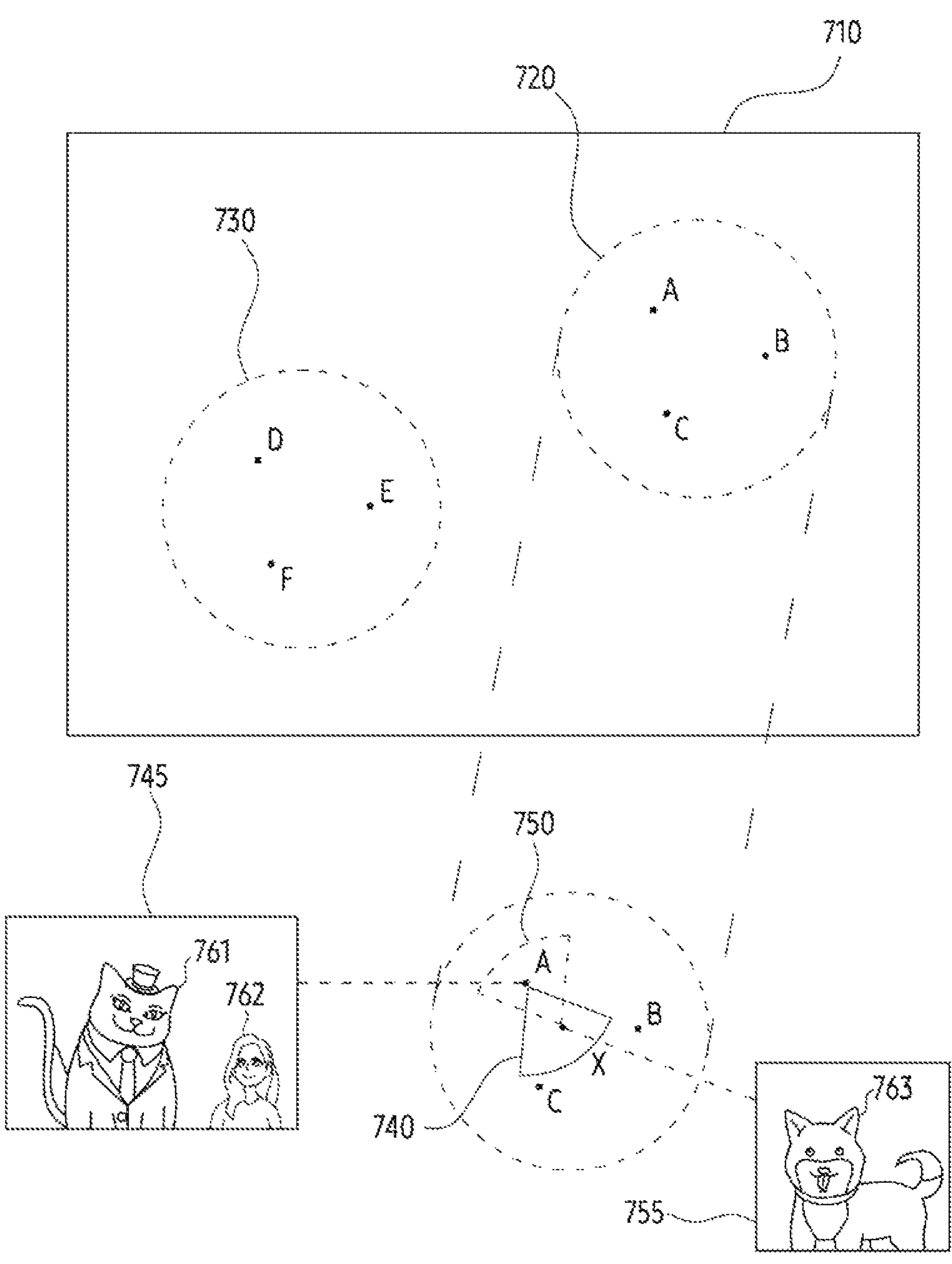
FIG. 7 illustrates an example of an operation in which an electronic device identifies a location where a virtual object is disposed, according to an embodiment.

FIG. 7 illustrates an example of an operation in which an electronic device identifies a location X where a virtual object is to be disposed, according to an embodiment. An electronic device 310 of FIGS. 3 to 4 may include the electronic device of FIG. 7. Referring to FIG. 7, operation performed to select the location X of the first virtual object will be exemplarily described, in a state in which the electronic device receives a first signal including a request for disposing the first virtual object in a virtual space 710 from an external electronic device.

Referring to FIG. 7, an example of a plan view of the virtual space 710 in which second virtual objects different from the first virtual object are disposed is illustrated. The second virtual objects may be disposed at locations A, B, C, D, E, and F of the virtual space 710 at the timing when the electronic device receives the first signal. Among the external electronic devices connected to the electronic device, the second virtual objects may correspond to each of other external electronic devices different from the external electronic device that transmitted the first signal. In the exemplary state of FIG. 7 in which the second virtual objects are disposed in each of the locations A, B, C, D, E, and F of the virtual space 710, the electronic device may transmit information for displaying at least a portion of the virtual space 710 based on the view angle of the second virtual objects disposed in each of the locations A, B, C, D, E, and F to the other external electronic devices.

According to an embodiment, the electronic device may select the location X in the virtual space 710 of the first virtual object, based on at least one of spatial information (e.g., spatial information 450 of FIG. 4) corresponding to the virtual space 710, first user information corresponding to the first virtual object corresponding to the first signal, or second user information corresponding to the second virtual objects, based on receiving the first signal. In one embodiment, the electronic device may identify one group used to identify the location X and corresponding to the first virtual object by using the spatial information, the first user information, and the second user information. The group corresponding to the first virtual object may be identified among groups assigned to each of the second virtual objects.

In the exemplary case of FIG. 7, the electronic device may identify or determine a first group including virtual objects disposed in the locations A, B, and C, and a second group including virtual objects disposed in the locations D, E, and F, among the second virtual objects. The electronic device may identify the group corresponding to the first virtual object among the first group and the second group based on the above-described operation with reference to FIG. 6. In the exemplary case of FIG. 7, the electronic device may identify or determine the first group among the first group or the second group as the group corresponding to the first virtual object.

According to an embodiment, the electronic device may identify the location X in the virtual space 710 in which the first virtual object is to be disposed, based on the location in the virtual space 710 of at least one virtual object included in the group including the first virtual object, among the second virtual objects disposed in the virtual space 710. In one embodiment, the electronic device selects, as the group corresponding to the first virtual object, the first group including the virtual objects disposed at the locations A, B, and C among the second virtual objects, the electronic device may select the location X of the first virtual object in an area 720 in the virtual space 710 including the locations A, B, and C. In one embodiment, the electronic device may dispose the first virtual object in the area 720 different from an area 730 including the locations D, E, and F of the virtual objects disposed in the second group different from the first group, among the second virtual objects.

According to an embodiment, the electronic device may determine the location and/or a direction of the first virtual object based on the location and/or the direction of any one of the second virtual objects disposed in the virtual space 710. In one embodiment, the electronic device selects the location X of the first virtual object based on the virtual objects included in the first group among the second virtual objects, the electronic device may select a virtual object having the most similar score to the score of the first virtual object among the virtual objects included in the first group. In one embodiment, in case that the score of the virtual object disposed at a location A has the most similar score to the score of the first virtual object among the virtual objects included in the first group, the electronic device may determine the location and/or the direction of the first virtual object based on the location and/or the direction of the virtual object disposed at the location A.

Referring to FIG. 7, in the above example, the electronic device may select the location X of the first virtual object in a view angle 740 of the virtual object disposed at the location A. Since the location X of the first virtual object is included in the view angle 740, the external electronic device corresponding to the virtual object disposed in the location A may display an image 745 based on the view angle 740. In the exemplary case of FIG. 7, a visual object 761 representing the first virtual object and a visual object representing another virtual object 762 disposed in a location C may be displayed in the image 745. The visual objects 761 and 762 included in the image 745 may represent the first virtual object having the shape of an avatar and the other virtual object.

Referring to FIG. 7, in an embodiment of selecting the location X of the first virtual object based on the virtual object disposed at the location A, the electronic device may identify the view angle 750 including the virtual object in the location A, which is used to identify the location X, as the view angle 750 of the first virtual object. The first virtual object disposed at the location X may have the view angle 750 including the virtual object disposed at the location A. Since the virtual object disposed at the location A is included in the view angle 750, an image 755 including a visual object 763 representing the virtual object disposed at the location A may be displayed in the display of the external electronic device corresponding to the first virtual object. In one embodiment, the electronic device may determine the direction of the first virtual object disposed at the location X as a direction toward the virtual object disposed at the location A.

Referring to FIG. 7, based on identifying the location X of the first virtual object, the electronic device may transmit a second signal, in response to the first signal, to the external electronic device that has transmitted the first signal. The electronic device may transmit the second signal representing the first virtual object disposed at the identified location X in the virtual space 710, to the external electronic device. Based on the second signal, the external electronic device may display the image 755 to the user of the external electronic device. Similarly, the electronic device may transmit a signal representing at least a portion of the virtual space 710 including the first virtual object disposed at the location X in the virtual space 710, to the external electronic devices corresponding to the second virtual objects.

According to an embodiment, the electronic device may add one or more virtual objects corresponding to the first virtual object into the virtual space 710 based on the spatial information based on the virtual space 710, in a state of determining the location X in the virtual space 710 of the first virtual object. In one embodiment, based on an event occurring in the virtual space 710, the electronic device may add the virtual object indicated by the event to the location X of the first virtual object while adding the first virtual object in the virtual space 710. In one embodiment, in case that an event such as a class occurs, the electronic device may make the shape of the first virtual object, which is the avatar, into a shape of sitting on the chair, by adding a virtual object having the shape of the chair to the location X of the first virtual object.

According to an embodiment, in case that the group corresponding to the first virtual object cannot be selected from among groups assigned to each of the second virtual objects, the electronic device may select a location of the first virtual object based on a random number.

As described above, according to an embodiment, the electronic device may select a location of at least one of the avatars based on a relationship between the avatars, in a state of disposing at least one of the avatars corresponding to different users in the virtual space 710. The relationship between the avatars may be identified based on at least one of user information (e.g., user information 440 of FIG. 4) of the users corresponding to the avatars or spatial information (e.g., spatial information 450 of FIG. 4) corresponding to the virtual space 710. In one embodiment, the electronic device may determine the location and/or the direction of the avatar entering the virtual space 710, based on the relationship between other avatars included in the virtual space 710 and the avatar.

Hereinafter, an operation of the electronic device according to an embodiment will be described with reference to FIGS. 8 and 9.

Figure 8:
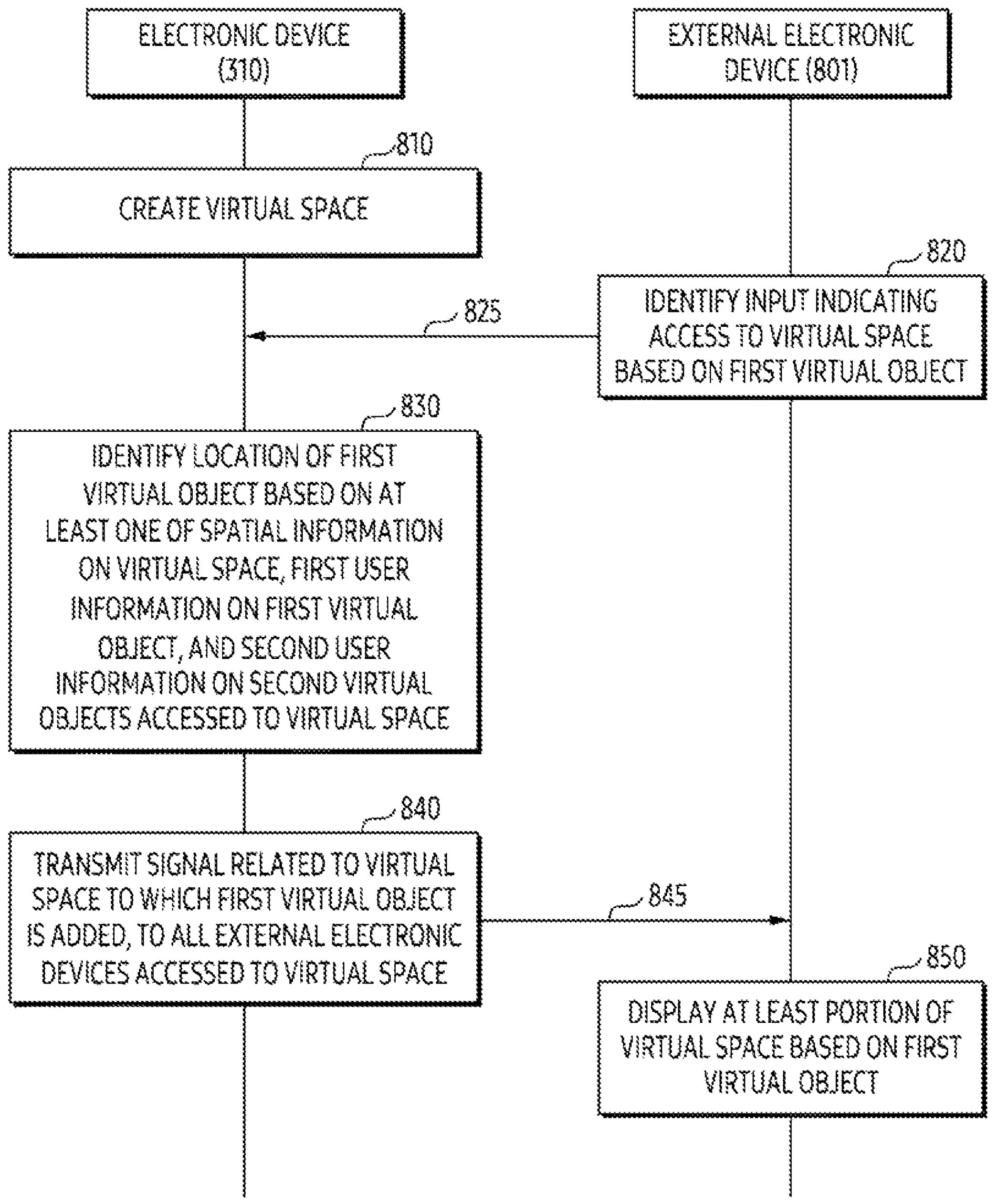
FIG. 8 illustrates an example of a signal flowchart of an electronic device and an external electronic device according to an embodiment.

FIG. 8 illustrates an example of a signal flowchart of an electronic device and an external electronic device according to an embodiment. An electronic device 310 of FIGS. 3 to 4 may include the electronic device of FIG. 8. In one embodiment, the operation of FIG. 8 may be performed by the electronic device 310 of FIGS. 3 to 4 and/or at least one processor 410 of FIG. 4. In the following embodiment, each operation may be performed sequentially, but is not necessarily performed sequentially. In one embodiment, the order of each operation may be changed, and at least two operations may be performed in parallel.

Referring to FIG. 8, in operation 810, according to an embodiment, the electronic device 310 may create a virtual space (e.g., a virtual space 330 of FIGS. 3 and/or 5 and/or a virtual space 710 of FIG. 7). The electronic device 310 may identify the virtual space and one or more virtual objects included in the virtual space by using spatial information (e.g., spatial information 450 of FIG. 4). The electronic device 310 may provide a service (e.g., a metaverse service) for enhancing interconnectivity of physically separated external electronic devices (e.g., an HMD 321, a mobile phone 322, and/or a laptop PC 323 of FIG. 3) by using the virtual space created based on the operation 810.

Referring to FIG. 8, in operation 820, according to an embodiment, an external electronic device 801 may identify an input indicating access to the virtual space based on a first virtual object. The input may be received from a user of the external electronic device 801 through a preset application executed on the external electronic device 801 and may include information for authenticating the user. The preset application is an application for communicating with the electronic device 310 and may include an application for the metaverse service. Based on the input, the external electronic device 801 may transmit a first signal 825 for disposing the first virtual object in the virtual space to the electronic device 310. The electronic device 310 may receive the first signal 825 through a communication circuitry (e.g., a communication circuitry 430 of FIG. 4).

Referring to FIG. 8, in operation 830, according to an embodiment, the electronic device 310 may identify a location of the first virtual object based on at least one of spatial information on the virtual space, first user information on the first virtual object, and second user information on the second virtual objects accessed to the virtual space. The electronic device 310 may perform the operation 830 based on receiving the first signal 825. The electronic device 310 may identify the location of the first virtual object in the virtual space by using the spatial information used to create the virtual space in the operation 810. The electronic device 310 may classify the first virtual object and the second virtual objects by using the second user information on the second virtual objects included in the virtual space in the timing at which the first user information corresponding to the first virtual object and the first signal 825 are received. Based on the result of classifying the first virtual object and the second virtual objects, the electronic device 310 may identify the location of the first virtual object.

Referring to FIG. 8, in operation 840, according to an embodiment, the electronic device 310 may transmit a signal related to the virtual space to which the first virtual object is added, to all external electronic devices accessed to the virtual space. In one embodiment, the electronic device 310 may transmit a second signal 845 related to the virtual space to which the first virtual object is added, to the external electronic device 801 that has transmitted the first signal 825. The second signal 845 may include information for displaying at least a portion of the virtual space based on the location of the first virtual object in the virtual space.

Referring to FIG. 8, in operation 850, according to an embodiment, the external electronic device 801 may display at least a portion of the virtual space based on the first virtual object. The external electronic device 801 may perform the operation 850 based on receiving the second signal 845 from the electronic device 310. The external electronic device 801 may display at least a portion of the virtual space identified from the second signal 845 through a display in the external electronic device 801.

Figure 9:
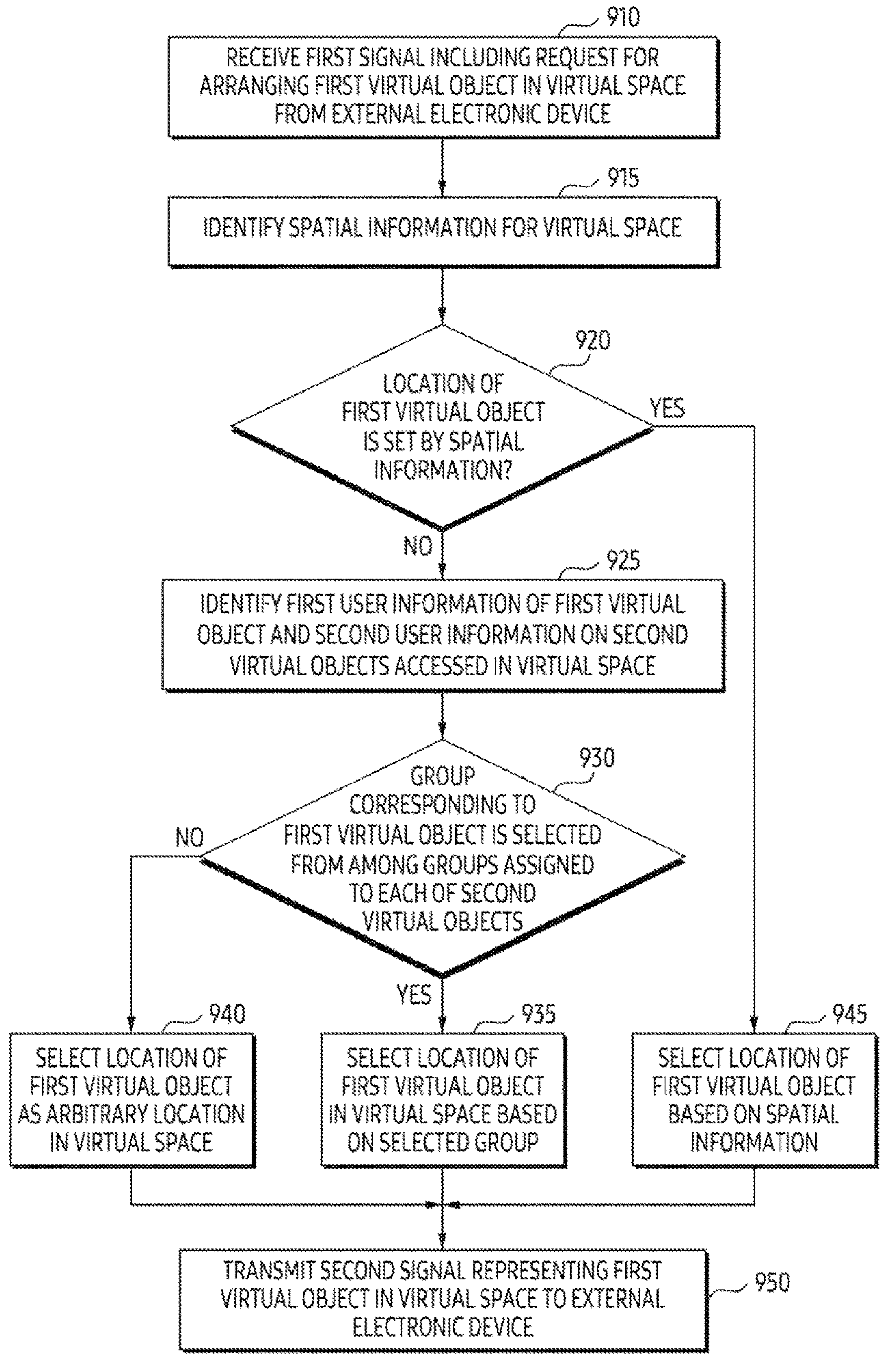
FIG. 9 illustrates an example of a flowchart for an electronic device according to an embodiment.

FIG. 9 illustrates an example of a flowchart for an electronic device according to an embodiment. An electronic device 310 of FIGS. 3 to 4 may include the electronic device of FIG. 9. In one embodiment, the operation of FIG. 9 may be performed by the electronic device 310 of FIGS. 3 to 4 and/or at least one processor 410 of FIG. 4. At least one of the operations of FIG. 9 may be related to at least one (e.g., operations 830 and 840 of FIG. 8) of the operations of the electronic device 310 of FIG. 8. In the following embodiment, each operation may be performed sequentially, but is not necessarily performed sequentially. In one embodiment, the order of each operation may be changed, and at least two operations may be performed in parallel.

Referring to FIG. 9, in operation 910, according to an embodiment, the electronic device may receive a first signal including a request for arranging the first virtual object in a virtual space from an external electronic device. The first signal of the operation 910 may include a first signal 825 of FIG. 8.

Referring to FIG. 9, in operation 915, according to an embodiment, the electronic device may identify spatial information (e.g., spatial information 450 of FIG. 4) for the virtual space. The electronic device may identify information (e.g., event information 454 of FIG. 4) related to an event occurring in the virtual space from the spatial information.

Referring to FIG. 9, in operation 920, according to an embodiment, the electronic device may determine whether the location of the first virtual object is set by the spatial information. The electronic device may identify a preset location set to dispose the virtual object in the virtual space from the spatial information. In a state in which the location of the first virtual object is identified from the spatial information (920—YES), the electronic device may select the location of the first virtual object based on the spatial information of the operation 915, by performing operation 945.

Referring to FIG. 9, in a state different from the state in which the location of the first virtual object is identified from the spatial information (920—NO), based on operation 925, the electronic device may identify first user information of the first virtual object and second user information on second virtual objects accessed in the virtual space. The second virtual objects may be disposed in the virtual space at the timing of receiving the first signal of the operation 910 and may correspond to electronic devices and other external electronic devices different from the external electronic device of the operation 910. The electronic device may classify the first virtual object and the second virtual objects as described above with reference to FIG. 6 based on the first user information and the second user information.

Referring to FIG. 9, in operation 930, according to an embodiment, the electronic device may determine whether a group corresponding to the first virtual object is selected from among groups assigned to each of the second virtual objects. The electronic device may identify the group corresponding to the first virtual object based on a result of classifying the first virtual object and the second virtual objects based on the operation 925.

Referring to FIG. 9, in a state in which the first virtual object is included in any one of the groups assigned to each of the second virtual objects (930—YES), based on operation 935, according to an embodiment, the electronic device may select the location of the first virtual object in the virtual space based on the group selected by the operation 930. As described above with reference to FIG. 7, the electronic device may select the location and/or the direction of the first virtual object based on the location and/or the direction of at least one virtual object included in the group selected by the operation 930 from among the second virtual objects.

Referring to FIG. 9, in a state in which the first virtual object is classified into a group different from the groups assigned to each of the second virtual objects (930—NO), based on operation 940, according to an embodiment, the electronic device may select the location of the first virtual object as an arbitrary location in the virtual space. In one embodiment, the electronic device may select the location of the first virtual object based on coordinates including at least one random number value.

Referring to FIG. 9, in operation 950, according to an embodiment, the electronic device may transmit a second signal representing the first virtual object in the virtual space to the external electronic device. The electronic device may transmit the second signal representing the first virtual object disposed at the location of the first virtual object selected by any of the operations 935, 940, and 945 to the external electronic device of the operation 910. The second signal of the operation 950 may include the second signal 845 of FIG. 8.

As described above, according to an embodiment, the electronic device may execute different functions related to the virtual space based on one or more external electronic devices connected to the electronic device. The electronic device that receives the first signal for entering the virtual space by using the first virtual object from the first external electronic device may identify the at least one virtual object related to the first virtual object among the second virtual objects included in the virtual space. The electronic device may determine the location and/or the direction of the first virtual object in the virtual space based on the location and/or the direction of the identified at least one virtual object.

A method of determining a location of a virtual object to be added in a virtual space provided by an electronic device based on a relationship between a user corresponding to the virtual object and another user corresponding to another virtual object different from the virtual object may be required. As described above, according to an embodiment, the electronic device (an electronic device 310 of FIGS. 3 to 4 and/or 8) may include a communication circuitry (a communication circuitry 430 of FIG. 4), a memory (a memory 420 of FIG. 4), and at least one processor (at least one processor 410 of FIG. 4). The at least one processor may be configured to receive, from an external electronic device (e.g., an external electronic device 801 of FIG. 8) via the communication circuitry, a first signal (e.g., a first signal 825 of FIG. 8) including a request for arranging a first virtual object in a virtual space (e.g., a virtual space 330 of FIG. 3). The at least one processor may be configured to obtain, by using first user information with respect to the first virtual object, and second user information with respect to the second virtual objects accessed to the virtual space, a group corresponding to the first virtual object among groups respectively allocated to the second virtual objects. The at least one processor may be configured to identify, based on a location, in the virtual space, of at least one second virtual object included in the group corresponding to the first virtual object, a location in the virtual space where the first virtual object is disposed. The at least one processor may be configured to transmit, a second signal (e.g., a second signal 845 of FIG. 8), to the external electronic device as a response to the first signal, representing the first virtual object disposed in the identified location in the virtual space. According to an embodiment, the electronic device may identify a location of a first virtual object in a virtual space based on locations of second virtual objects different from the first virtual object.

In one embodiment, the at least one processor may be configured to identify spatial information (e.g., spatial information 450 of FIG. 4) for forming or establishing the virtual space. The at least one processor may be configured to obtain, based on one or more weights indicated by the spatial information, the group corresponding to the first virtual object.

In one embodiment, the at least one processor may be configured to identify, based on event information (e.g., event information 454 of FIG. 4) occurred in the virtual object that is included in the spatial information, the one or more weights.

In one embodiment, the at least one processor may be configured to, based on identifying preset location from the spatial information set to locate the first virtual object, transmit, to the first external electronic device, the second signal representing the first virtual object located at the preset location.

In one embodiment, the at least one processor may be configured to obtain, a score for the first virtual object, by applying, to each of parameters included in the first user information, weights which are respectively corresponding to the parameters and are included in the spatial information. In one embodiment, the at least one processor may be configured to obtain, based on scores assigned to each of the second virtual object, the group corresponding to the first virtual object.

In one embodiment, the at least one processor may be configured to identify the first user information indicating an action of a first user of the first external electronic device that is performed based on the first virtual object in the virtual space.

In one embodiment, the at least one processor may be configured to identify, among the second virtual object, a virtual object included in the group corresponding to the first virtual object. The at least one processor may be configured to identify, in a view angle of the identified virtual object in the virtual space, a location of the first virtual object.

In one embodiment, the at least one processor may be configured to transmit, to the external electronic device, the second signal representing the first virtual object having a direction toward to the identified virtual object and being located in the view angle of the identified virtual object.

As described above, according to an embodiment, the method of an electronic device, may include receiving, from an external electronic device via a communication circuitry in the electronic device, a first signal including a request for arranging a first virtual object in a virtual space. The method may include identifying a first location in the virtual object where the first virtual object is located by using spatial information with respect to the virtual space. The method may include, in a second state different from a first state identifying the first position by using the spatial information, identifying, among groups respectively assigned to second virtual objects accessed to the virtual space, a group corresponding to the first virtual object. The method may include identifying, based on a second location, in the virtual space, of at least one second virtual object included in the group corresponding to the first virtual object, third location in the virtual object where the first virtual object is located. The method may include transmitting, to the external electronic device as a response to the first signal, a second signal for locating the first virtual object in the virtual space based on at least one of the first position or the third position.

In one embodiment, the identifying the group may include obtaining, a score for the first virtual object, by applying, to each of parameters included in the first user information, weights which are respectively corresponding to the parameters and are included in the spatial information. In one embodiment, the identifying the group may include identifying, based on a score for the first virtual object and scores assigned to each of the second virtual objects, the group corresponding to the first virtual object.

In one embodiment, the identifying the first location may include identifying, based on identifying a preset location set to locate the first virtual object from the spatial information, the preset location as the first location.

In one embodiment, the method may include identifying, based on identifying that the first virtual object is included in a group different from the groups allocated to each of the second virtual objects, a fourth location in the virtual object where the first virtual object is located based on a random number.

In one embodiment, the identifying the third location may include identifying, in a view angle of a virtual object among the second virtual objects included in the group corresponding to the first virtual object, the third location of the first virtual object.

In one embodiment, the identifying the third location may include identifying a view angle including second virtual object used for identifying the third location as a view angle of the first virtual object.

In one embodiment, the transmitting may include transmitting, to the external electronic device, the second signal representing at least portion of the virtual space including the first virtual object.

As described above, according to an embodiment, a method of an electronic device, may include receiving, from an external electronic device via a communication circuitry in the electronic device, a first signal including a request for arranging a first virtual object in a virtual space. The method may include obtaining, by using first user information with respect to the first virtual object, and second user information with respect to the second virtual objects accessed to the virtual space, a group corresponding to the first virtual object among groups respectively allocated to the second virtual objects. The method may include identifying, based on a location, in the virtual space, of at least one second virtual object included in the group corresponding to the first virtual object, a location in the virtual space where the first virtual object is disposed. The method may include transmitting, a second signal, to the external electronic device as a response to the first signal, representing the first virtual object disposed in the identified location in the virtual space.

In one embodiment, the obtaining may include identifying spatial information for forming or establishing the virtual space. In one embodiment, the obtaining may include obtaining, based on one or more weights indicated by the spatial information, the group corresponding to the first virtual object.

In one embodiment, the obtaining may include identifying, based on event information occurred in the virtual object that is included in the spatial information, the one or more weights.

In one embodiment, the transmitting may include, based on identifying preset location from the spatial information set to locate the first virtual object, transmitting, to the first external electronic device, the second signal representing the first virtual object at the preset location.

In one embodiment, the obtaining may include obtaining, a score for the first virtual object, by applying, to each of parameters included in the first user information, weights which are respectively corresponding to the parameters and are included in the spatial information. The obtaining may include obtaining, based on scores assigned to each of the second virtual object, the group corresponding to the first virtual object.

In one embodiment, the obtaining may include identifying the first user information, indicating an action of the first user of the external electronic device that is performed based on the first virtual object in the virtual space.

In one embodiment, the identifying may include identifying, among the second virtual object, a virtual object included in the group corresponding to the first virtual object. The identifying may include identifying, in a view angle of the identified virtual object in the virtual space, a location of the first virtual object.

In one embodiment, the transmitting may include, transmitting to the external electronic device, the second signal representing the first virtual object having a direction toward to the identified virtual object and being located in the view angle of the identified virtual object.

As described above, according to an embodiment, the electronic device (an electronic device 310 of FIGS. 3 to 4 and/or 8) may include a communication circuitry (a communication circuitry 430 of FIG. 4) and at least one processor (at least one processor 410 of FIG. 4). The at least one processor may be configured to receive, from an external electronic device (e.g., an external electronic device 801 of FIG. 8) via a communication circuitry, a first signal (e.g., a first signal 825 of FIG. 8) including a request for arranging a first virtual object in a virtual space (e.g., a virtual space 330 of FIG. 3). The at least one processor may be configured to identify a first location in the virtual object where the first virtual object is located by using spatial information with respect to the virtual space. The at least one processor may be configured to, in a second state different from a first state identifying the first position by using the spatial information, identify, among groups respectively assigned to second virtual objects accessed to the virtual space, a group corresponding to the first virtual object. The at least one processor may be configured to identify, based on a second location, in the virtual space, of at least one second virtual object included in the group corresponding to the first virtual object, third location in the virtual object where the first virtual object is located. The at least one processor may be configured to transmit, to the external electronic device as a response to the first signal, a second signal (e.g., a second signal 845 of FIG. 8) for locating the first virtual object in the virtual space based on at least one of the first position or the third position.

In one embodiment, the at least one processor may be configured to obtain, a score for the first virtual object, by applying, to each of parameters included in the first user information, weights which are respectively corresponding to the parameters and are included in the spatial information. The at least one processor may be configured to identify, based on a score for the first virtual object and scores assigned to each of the second virtual objects, the group corresponding to the first virtual object.

In one embodiment, the at least one processor may be configured to identify, based on identifying a preset location set to locate the first virtual object from the spatial information, the preset location as the first location.

In one embodiment, the at least one processor may be configured to identify, based on identifying that the first virtual object is included in a group different from the groups allocated to each of the second virtual objects, a fourth location in the virtual object where the first virtual object is located based on a random number.

In one embodiment, the at least one processor may be configured to identify, in a view angle of a virtual object among the second virtual objects included in the group corresponding to the first virtual object, the third location of the first virtual object.

In one embodiment, the at least one processor may be configured to identify a view angle including second virtual object used for identifying the third location as a view angle of the first virtual object.

In one embodiment, the at least one processor may be configured to transmit, to the external electronic device, the second signal representing at least portion of the virtual space including the first virtual object.

The apparatus described above may be implemented as a combination of hardware components, software components, and/or hardware components and software components. In one embodiment, the devices and components described in the embodiments may be implemented using one or more general purpose computers or special purpose computers such as processors, controllers, arithmetical logic unit (ALU), digital signal processor, microcomputers, field programmable gate array (FPGA), PLU (programmable logic unit), microprocessor, any other device capable of executing and responding to instructions. The processing device may perform an operating system OS and one or more software applications performed on the operating system. In addition, the processing device may access, store, manipulate, process, and generate data in response to execution of the software. For convenience of understanding, although one processing device may be described as being used, a person skilled in the art may see that the processing device may include a plurality of processing elements and/or a plurality of types of processing elements. In one embodiment, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner. Software and data may be stored in one or more computer-readable recording media.

The method according to the embodiment may be implemented in the form of program instructions that may be performed through various computer means and recorded in a computer-readable medium. In this case, the medium may continuously store a computer-executable program or temporarily store the program for execution or download. In addition, the medium may be a variety of recording means or storage means in which a single or several hardware are combined and is not limited to media directly connected to any computer system and may be distributed on the network. Examples of media may include magnetic media such as hard disks, floppy disks and magnetic tapes, optical recording media such as CD-ROMs and DVDs, magneto-optical media such as floppy disks, ROMs, RAMs, flash memories, and the like to store program instructions. Examples of other media include app stores that distribute applications, sites that supply or distribute various software, and recording media or storage media managed by servers.

Although embodiments have been described according to limited embodiments and drawings as above, various modifications and modifications are possible from the above description to those of ordinary skill in the art. In one embodiment, even if the described techniques are performed in a different order from the described method, and/or components such as the described system, structure, device, circuit, etc. are combined or combined in a different form from the described method or are substituted or substituted by other components or equivalents, appropriate results may be achieved.

Therefore, other implementations, other embodiments, and equivalents to the claims fall within the scope of the claims to be described later.

What is claimed is:

1. An electronic device comprising:

communication circuitry;

memory comprising one or more storage media storing instructions; and at least one processor comprising processing circuitry, wherein the instructions, when executed by the at least one processor individually or collectively, cause the at least one processor to:

receive, from an external electronic device via the communication circuitry, a request for accessing to a virtual space using a virtual object representing a user of the external electronic device;

in response to the request, obtain, from spatial information of the virtual space, weight values respectively corresponding to a plurality of user attributes used for identifying the user of the external electronic device;

obtain, by applying the weight values to the plurality of user attributes, a score for the user of the external electronic device;

determine, from among a plurality of groups, a group for the user of the external electronic device based on the score for the user, wherein the plurality of groups are predetermined based on other scores for other users different from the user of the external electronic device;

determine, in the virtual space, a position of the virtual object based on a region allocated for the group to which the user of the external electronic device belongs; and transmit, to the external electronic device via the communication circuitry, information used for representing, in the virtual space, the virtual object positioned in the region allocated for the group to which the user of the external electronic device belongs, among a plurality of regions of the virtual space.

2. The electronic device of claim 1, wherein the spatial information defines a configuration of the virtual space, and wherein the configuration of the virtual space corresponds to a conference or a lesson.

3. The electronic device of claim 1, wherein the instructions, when executed by the at least one processor individually or collectively, cause the at least one processor to: identify, based on event information of the spatial information, weights used for obtaining the score for the user, and wherein the event information is information on an event occurring in the virtual space.

4. The electronic device of claim 3, wherein the instructions, when executed by the at least one processor individually or collectively, cause the at least one processor to:

based on identifying the region allocated for the group to which the user of the external electronic device belongs, select a position included in the region;

determine the selected position as the position of the virtual object; and transmit, to the external electronic device via the communication circuitry, the information used for representing the virtual object positioned at the selected location in the virtual space.

5. The electronic device of claim 1, wherein the region allocated for the group to which the user of the external electronic device belongs is one of the plurality of regions generated, based on the spatial information, in the virtual space.

6. The electronic device of claim 1, wherein the instructions, when executed by the at least one processor individually or collectively, cause the at least one processor to:

identify another virtual object representing another user included in the group;

select, in a view angle of the another virtual object, the position of virtual object; and based on locating the virtual object in the selected position, transmit, to another electronic device of the another user, signal for adding the virtual object in a screen, displayed in the another electronic device, representing the view angle of the another virtual object.

7. The electronic device of claim 6, wherein the instructions, when executed by the at least one processor individually or collectively, cause the at least one processor to:

transmit, to the external electronic device, the information used for representing the virtual object having a direction toward the another virtual object and being located in the view angle of the another virtual object.

8. A method of an electronic device, the method comprising:

receiving, from an external electronic device, a request for accessing to a virtual space using a first virtual object representing a user of the external electronic device;

in response to the request, identifying, in a first state, a first location of the first virtual object based on spatial information with respect to the virtual space;

in response to the request, identifying, in a second state, a plurality of user attributes in accordance with weights included in spatial information of the virtual space;

obtaining a score for the first virtual object, by applying, to a plurality of parameters used for identifying the user, the weights that respectively correspond to the plurality of parameters, wherein the weights are included in the spatial information;

determining, a group for the user based on the score for the first virtual object and scores for a plurality of second virtual objects;

determining a third location in which the first virtual object is located in the virtual space based on a second location, in the virtual space, of at least one second virtual object of the group determined for the user based on the grouping; and transmitting, to the external electronic device, information used for representing, in the virtual space, the first virtual object positioned at the first location or the third location in the virtual space.

9. The method of claim 8, wherein the identifying the first location of the first virtual object based on the spatial information, comprises determining, based on a preset location that is set to locate the first virtual object from the spatial information, the preset location as the first location.

10. The method of claim 8, further comprises determining, based on identifying that the first virtual object is included in a group different from a plurality of groups determined for the users, a fourth location, in the virtual space, where the first virtual object is located based on a random number.

11. The method of claim 8, wherein the determining the third location, in the virtual space, in which the first virtual object is located, comprises identifying, in a view angle of a virtual object being located in the group determined for the user among the plurality of second virtual objects, the third location of the first virtual object.

12. The method of claim 11, wherein the determining the third location, in the virtual space, in which the first virtual object is located, comprises identifying a view angle comprising a second virtual object used for identifying the third location as a view angle of the first virtual object.

13. The method of claim 8, wherein the transmitting the information used for representing the first virtual object at the first location or the third location in the virtual space, comprises transmitting, to the external electronic device, the information used for representing at least a portion of the virtual space comprising the first virtual object.

14. A method of an electronic device, the method comprising:

receiving, from an external electronic device via the communication circuitry, a request for accessing to a virtual space using a virtual object representing a user of the external electronic device;

in response to the request, obtaining, from spatial information of the virtual space, weight values respectively corresponding to a plurality of user attributes used for identifying the user of the external electronic device;

obtaining, by applying the weight values to the plurality of user attributes, a score for the user of the external electronic device;

determining, from among a plurality of groups, a group for the user of the external electronic device based on the score for the user, wherein the plurality of groups are predetermined based on other scores for other users different from the user of the external electronic device;

determining, in the virtual space, a position of the virtual object based on a region allocated for the group to which the user of the external electronic device belongs; and transmitting, to the external electronic device via the communication circuitry, information used for representing, in the virtual space, the virtual object positioned in the region allocated for the group to which the user of the external electronic device belongs, among a plurality of regions of the virtual space.

15. The method of claim 14, wherein the spatial information defines a configuration of the virtual space, and wherein the configuration of the virtual space corresponds to a conference or a lesson.

16. The method of claim 14, comprising identifying, based on event information of the spatial information, weights used for obtaining the score for the user, wherein the event information is information on an event occurring in the virtual space.

17. The method of claim 16, further comprising:

based on identifying the region allocated for the group to which the user of the external electronic device belongs, selecting a position included in the region;

determining the selected position as the position of the virtual object; and transmitting, to the external electronic device via the communication circuitry, the information used for representing the virtual object positioned at the selected location in the virtual space.

* * * * *